Figure 1:
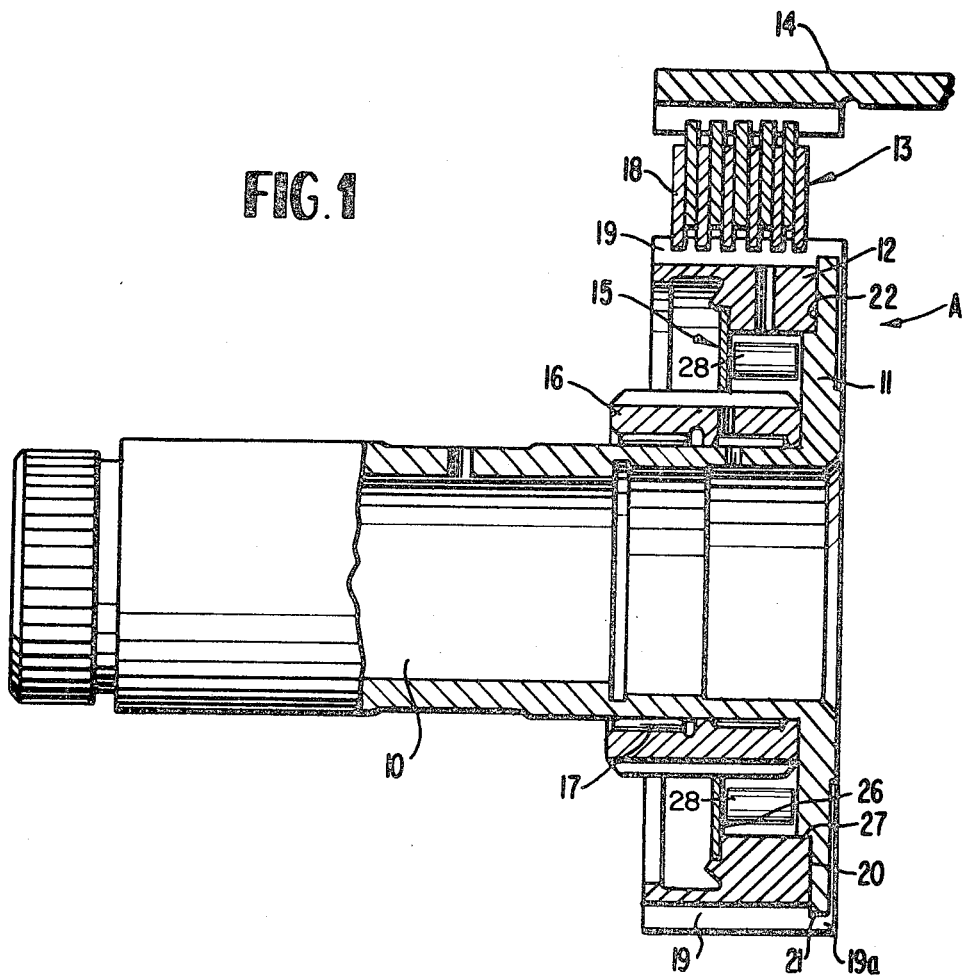

United States Patent

Helmer

[15] 3,706,364
[45] Dec. 19, 1972

[54] FORM-LOCKING CONNECTION OF TORQUE-TRANSMITTING STRUCTURAL PARTS, ESPECIALLY IN AUTOMATIC MOTOR VEHICLE TRANSMISSIONS

[72] Inventor: Josef Helmer, Aich Kreas Nurtingen, Germany

[73] Assignee: Daimler-Benz Aktiengesellschaft, Stuttgart-Untertuerkheim, Germany

[22] Filed: May 28, 1971

[21] Appl. No.: 147,775

Related U.S. Application Data

[62] Division of Ser. No. 825,272, May 16, 1969, Pat. No. 3,606,412.

[30] Foreign Application Priority Data

May 16, 1968 Germany....................P 17 50 586.1

[52] U.S. Cl..............192/48.92, 192/110 R, 29/510, 29/521

[51] Int. Cl..........................F16d 41/04, B23p 11/00
[58] Field of Search..192/48.92, 110 R; 29/505, 510, 29/511, 521, 520; 287/53 SS

[56] References Cited

UNITED STATES PATENTS

| 2,082,129 | 6/1937 | Van Ranst | 192/48.92 X |
| 2,162,902 | 6/1939 | Adams | 287/53 R |
| 3,251,442 | 5/1966 | Aschauer | 192/48.92 X |

*Primary Examiner*—Allan D. Herrmann
*Attorney*—Craig & Antonelli

[57] ABSTRACT

A form-locking connection between a first structural part provided with external teeth and a second structural part; the external teeth of the first structural part are extended beyond its end face, and the second structural part is provided with external teeth engaging into the overhanging portion of the external teeth of the first structural part.

4 Claims, 2 Drawing Figures

Inventor
JOSEF HELMER
By Craig, Antonelli and Hill
Attorneys

FORM-LOCKING CONNECTION OF TORQUE-TRANSMITTING STRUCTURAL PARTS, ESPECIALLY IN AUTOMATIC MOTOR VEHICLE TRANSMISSIONS

This is a divisional application of U.S. application Ser. No. 825,272, filed May 16, 1969, now U.S. Pat. No. 3,606,412.

The present invention relates to a form-locking connection between a torque-receiving first structural part provided with teeth and a second torque-receiving structural part, especially between lamellae clutch carriers and/or free-wheeling rings with hub-or disk-parts in automatically shifting motor vehicle transmissions.

In many fields of engineering there exists the problem of connecting parts, which are provided with a toothed arrangement, at the end face with other parts to rotate in unison therewith. This is, for example, frequently necessary in the construction of transmissions of motor vehicles, and above all in the construction of automatically shifting transmissions which are built up of planetary gear sets. In such transmissions, shafts or hollow shafts have to be connected frequently with parts that split up or divide the torque, for example, with carriers of clutch lamellae which simultaneously are free-wheeling rings or carriers of other clutch or brake lammelae. Radial serrations, as for example, the known Hirth-type serrations, can be used therefor which, however, are costly and complicated and can be manufactured only with a so-called clearance cut. Consequently, such end face or radial serrations require additionally a considerable amount of space. It has also been already attempted to establish the connection by means of end-face claws. This is equally complicated in the manufacture and, for example, in free-wheel rings has also led to breakages and failures by reason of the large expansion forces occurring thereat.

The present invention has for its purpose to eliminate the aforementioned disadvantages. One aims thereby, above all, at simplifying the manufacture and assembly. The underlying problems are solved according to the present invention in the connections of the aforementioned type in that the toothed arrangement at the first structural part is extended beyond an end face thereof and in that the second structural part engages with a corresponding toothed arrangement in this overhanging area of the teeth of the first structural part, and in that with an end face abutment of the two structural parts against one another, the teeth of one structural part axially project slightly beyond the other and are wedged over or pryed over with respect thereto.

The construction of the connection according to the present invention results in quite a considerable simplification by reason of the fact that an already present toothed arrangement is now utilized also, so to speak of, as a connecting element. It is therefore not necessary to provide especially for that purpose, the manufacture and assembly of separate elements. Surprisingly, a considerable improvement is obtained also from a strength point of view. Primarily, this is due in all probability to the fact that this connection is so inherently elastic that local stress peaks are avoided and all mutually meshing parts share uniformly in the carrying and bearing task.

A further feature of the present invention resides in that the toothed arrangement at the first structural part is reduced in the overhanging area at the bottom at least by an amount corresponding to the rounded-off portions. A better mutual engagement of the teeth is achieved thereby.

A further proposal according to the present invention goes to the effect that the teeth of the engaging toothed arrangement have a relatively great height in comparison to the engaging area and the tooth gap bottom at the engaging toothed arrangement is disposed in a considerable distance from the bottom of the overhanging toothed arrangement at the first structural part. A springy yieldingness of all the teeth is achieved thereby which has a consequence that during the engagement not only manufacturing inaccuracies are automatically compensated but that in every case all the teeth uniformly participate in the torque transmission. In particular cases, the present invention then further proposes that both structural parts are additionally centered with respect to each other. In some cases one may dispense with such centering, particularly as the teeth can be manufactured coaxially with greater accuracy in the hob method.

For a preferred application, the present invention proposes that a hollow shaft is provided at one end with an outwardly turned flange that carries at the outer circumference the engaging teeth which engage in the overhanging portion of an external toothed arrangement of an external free-wheeling ring serving simultaneously as inner lamellae carrier of a clutch. It is then additionally proposed in connection therewith that the outer free-wheeling ring is centered with its inner diameter at the hollow shaft on an offset of the flange and that the inner free-wheeling ring is supported on the hollow shaft.

Accordingly, it is an object of the present invention to provide a form-locking connection of torque-transmitting structural parts, especially in automatic transmission which avoids by simple means the aforementioned shortcomings and drawbacks encountered in the prior art.

Another object of the present invention resides in a form-locking connection of torque-transmitting structural parts which can be manufactured in a relatively simple and inexpensive manner, obviates the need for considerable space in the assembled condition and is reliable in operation.

A further object of the present invention resides in a form-locking connection of the type described above which not only offers advantages as regards simplicity in manufacture and assembly but also produces a considerable improvement as regards strength and elimination of peak stresses.

Still a further object of the present invention resides in a form-locking connection of torque-transmitting structural parts in which manufacturing inaccuracies are automatically compensated for while the teeth share equally in the load.

Figure 2:
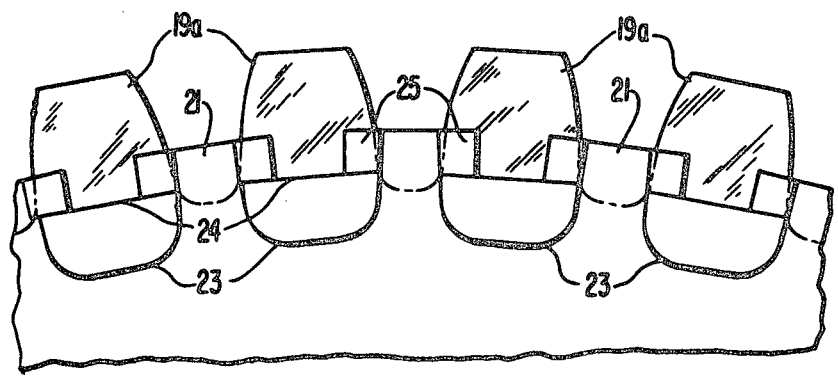

These and further objects, features and advantages of the present invention will become more obvious from the following description when taken in connection with the accompanying drawing which shows, for purposes of illustration only, one embodiment in accordance with the present invention, and wherein:

FIG. 1 is a partial cross-sectional view through a clutch and free-wheeling arrangement in accordance with the present invention; and FIG. 2 is a partial end view, on an enlarged scale, of a detail of the arrangement of FIG. 1, as viewed in the direction of arrow A.

Referring now to the drawing wherein like reference numerals are used throughout the two views to designate like parts, and more particularly to FIG. 1, the torque is introduced into the inner lamellae carrier 12 of a lamellae friction clutch generally designated by reference numeral 13 by means of a hollow shaft 10 which is provided at one end with a flanged part 11. The outer lamellae carrier 14 is operatively connected in a conventional manner, not illustrated herein, with a further transmission part. The inner lamellae carrier 12 serves simultaneously as outer ring or race for a conventional free-wheeling device or overrunning clutch generally designated by reference numeral 15 which is constructed as grip roller free-wheeling device and whose inner ring or race 16 is supported on the hollow shaft 10 by means of a needle bearing 17. A roller 28 is shown schematically in FIG. 1 for the free-wheeling device.

The inner lamellae carrier 12 is provided for the accommodation of the clutch lamellae 18 in a conventional manner with external teeth 19. The external toothed arrangement 19 is extended beyond the end face 20 of the inner lamellae carrier 12. Into this overhanging area 19a of the toothed arrangement 19 (see also FIG. 2) engages the flange 11 with its teeth 21 which are arranged at the outer circumference thereof. The toothed arrangement 21 is slightly smaller in its axial dimension than the overhanging portion 19a of the toothed arrangement 19 when the flange 11 abuts with its end surface 22 at the end surface 20 of the inner lamellae carrier 12.

The overhanging portion 19a of the toothed arrangement 19 is cut back from the inside to such an extent that at least the rounded-off area of the tooth gaps is eliminated so that the toothed arrangement 19a is now open in the inward direction. In FIG. 2, the original tooth shape of the toothed arrangement 19 is indicated in dash and dot lines. Into this now open toothed arrangement 19a can now be inserted from the side the flange 11 with its externally toothed arrangement 21. These external teeth 21 are constructed relatively long so that the tooth gap bottom 23 thereof has a considerable spacing from the bottom 24 of the teeth 19a. In this manner and together with the cut-back of the teeth 19a is achieved that the teeth of the toothed arrangement 21 are able to yield elastically over a relatively large length. After the insertion of the flange 11 into the toothed part 19a, the individual teeth of the lastmentioned toothed arrangement are peened over with respect to the teeth 21, as indicated in FIG. 2 by reference numeral 25. As a result thereof, a form-locking connection between the hollow shaft 10 and the inner lamellae carrier 12 is now achieved.

The free-wheeling device 15 is closed off on the side opposite the flange 11 by a disk 26 which is connected with the inner lamellae carrier 12 at the outer circumference by wedging-over or peening over at three or four places. The free-wheeling inner ring or race 16 is widened beyond the free-wheeling width and is connected thereat with a further structural part (not shown) by means of which the torque or a portion of the torque is further transmitted.

The outer free-wheeling ring is centered with its inner diameter at the hollow shaft on an offset 27 of the flange.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A form-locking connection between a first torque-transmitting structural part provided with first interdigitated toothed means and a second torque-transmitting structural part, characterized in that the first toothed means of the first structural part are extended beyond an end face thereof and have an overhanging portion, the second structural part engaging with a corresponding second toothed means into the overhanging portion of the first toothed means, and the toothed means of one structural part slightly projecting beyond the toothed means of the other structural part in the axial direction with end faces of the two structural parts abutting against each other and the toothed means of said one structural part being peened over with respect to the toothed means of said other structural part, the toothed means of the first structural part being shortened in the overhanging portion at the base by at least an amount corresponding to rounded-off portions of tooth gaps, the teeth of the second toothed means having a relatively large height compared to an area defined by the engagement of the second toothed means with the second structural part, the tooth bottom at the second toothed means being disposed at a considerable distance from the bottom of the overhanging toothed means at the first structural part, both structural parts being additionally centered with respect to each other, wherein said first torque transmitting part is an external ring of a free-wheeling device serving simultaneously as an inner lamellae carrier of a clutch, and wherein said second torque transmitting part is formed as an outwardly turned flange means at one end of a hollow shaft, the second toothed means being arranged at the outer circumference of the flange means.

2. A connection according to claim 1, wherein the external ring of the free-wheeling device is centered with its inner diameter at the hollow shaft on an offset of the flange means and the inner ring of the free-wheeling device is supported on the hollow shaft.

3. A form-locking connection between a first torque-transmitting structural part provided with first interdigitated toothed means and a second torque-transmitting structural part, characterized in that the first toothed means of the first structural part are extended beyond an end face thereof and have an overhanging portion, the second structural part engaging with a corresponding second toothed means into the overhanging portion of the first toothed means, and the toothed means of one structural part slightly projecting beyond the toothed means of the other structural part in the axial direction with end faces of the two structural parts abutting against each other and the toothed means of said one structural part being peened over with respect to the toothed means of said other structural part, said first torque transmitting part is an external ring of a free-wheeling device serving simultaneously as an inner lamellae carrier of a clutch, and wherein said second torque transmitting part is formed as an outwardly turned flange means at one end of a hollow shaft, the second toothed means being arranged at the outer circumference of the flange means.

4. A connection according to claim 3, wherein the external ring of the free-wheeling device is centered with its inner diameter at the hollow shaft on an offset of the flange means and the inner ring of the free-wheeling device is supported on the hollow shaft.

* * * * *